(12) United States Patent
Morales et al.

(10) Patent No.: US 7,913,160 B2
(45) Date of Patent: Mar. 22, 2011

(54) DOCUMENT VERSIONING BASED ON LAYER CONTENT

(75) Inventors: Javier A. Morales, Rochester, NY (US); Michael E. Farrell, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 1030 days.

(21) Appl. No.: 11/356,654

(22) Filed: Feb. 16, 2006

(65) Prior Publication Data
US 2007/0192685 A1   Aug. 16, 2007

(51) Int. Cl.
*G06F 17/21* (2006.01)
(52) U.S. Cl. ....................................................... 715/229
(58) Field of Classification Search ................... 715/229
See application file for complete search history.

(56) References Cited

U.S. PATENT DOCUMENTS

| | | | | |
|---|---|---|---|---|
| 5,983,243 | A * | 11/1999 | Heiney et al. | 715/235 |
| 6,623,529 | B1 * | 9/2003 | Lakritz | 715/205 |
| 6,919,967 | B1 * | 7/2005 | Pentecost et al. | 358/1.15 |
| 2002/0101609 | A1 * | 8/2002 | Fan | 358/1.15 |
| 2005/0141035 | A1 * | 6/2005 | Buckley | 358/1.18 |
| 2005/0213118 | A1 * | 9/2005 | Shitara et al. | 358/1.1 |
| 2005/0262430 | A1 * | 11/2005 | Croft | 715/507 |
| 2006/0179405 | A1 * | 8/2006 | Chao et al. | 715/517 |
| 2006/0224952 | A1 * | 10/2006 | Lin | 715/517 |
| 2006/0271523 | A1 * | 11/2006 | Brookler et al. | 707/3 |
| 2006/0288265 | A1 * | 12/2006 | Brookler | 715/500 |

OTHER PUBLICATIONS

Chao et al., Capturing the Layout of Electronic Documents for Reuse in Variable Data Printing (IEEE, Proceedings of the 2005 Eight International Conference on Document Analysis and Recognition, 2005), p. 1-5.*

* cited by examiner

*Primary Examiner* — Laurie Ries
*Assistant Examiner* — Frank D Mills
(74) *Attorney, Agent, or Firm* — Luis M. Ortiz; Kermit D. Lopez; Ortiz & Lopez, PLLC

(57) ABSTRACT

A document can contain multiple print layers. Different layers can be combined to produce different document versions. In this manner, a document can have an English version and a Spanish version that share graphics layers but have different text layers. A document's different layers can be difficult to track and the difficulty can lead to errors in document proofing and production. A discrimination module can automatically classify layers as common, graphics, and text containing. The text containing layers can be further grouped by native language. The layer groups can then be automatically combined to produce the desired document version specifications that can be rendered as document versions.

20 Claims, 5 Drawing Sheets

DOCUMENT VERSIONING BASED ON LAYER CONTENT

TECHNICAL FIELD

Embodiments relate to creating, editing, displaying, printing and proofing documents. Embodiments also relate to creating printable layers that can be combined to form documents where different layer combinations correspond to different document versions. Embodiments additionally relate to classifying layers into a layer group or into a common group based on the layer content.

BACKGROUND

A document is, roughly, a combination of textual and graphical elements that are rendered together. Two ways of rendering a document are printing it or displaying it on a display device such as a computer monitor. In professional settings, documents often have versions. Different versions of a document can arise from editing it or correcting it over time. Different versions of a document can also arise by changing the content to focus on different audiences. For example, one version of a document can be intended for an English speaking audience while a different version is intended for a Spanish speaking audience. Versions intended for different audiences are concurrently valid while versions arising from editing over time are sequentially valid.

Concurrently valid documents versions are difficult to track and maintain. Originally, every concurrent version was treated individually. Changing one version often resulted in laboriously making a related change to every other version. For example, if every version contained the same watermark, then changing the watermark entailed changing it for every version.

Layering is a technique that eases the process of making similar changes to many concurrent document versions. Returning to the example above, the different versions can all share a common watermark layer while each version has a unique text layer. The English version has an English text layer while the Spanish version has a Spanish text layer. Rendering the common watermark layer and a unique text layer can produce a version of the document. Some documents have many common layers and unique layers.

FIG. 4, labeled as "prior art", illustrates a document 401 containing layers. The document 401 is presented with as having a first layer 402 and a second layer 405 although many layered documents have many more layers. The first layer has layer content 404 and a layer type 403. The layer content 404 is what will be rendered when the layer is printed or displayed. The layer type 403 is a property of the layer 402. The layer type is usually inferred because most layers do not contain information that specifically indicates the layer type. The second layer 405 also has a layer type 406 and layer content 407. The layer content 407 of the second layer 405, however, contains numerous objects. The objects are two text layers 408, 409 and two graphics objects 410, 411.

Layers such as the first layer 402 have only one type of content, such as text or graphics. A layer containing only text has a "text only" layer type. A layer containing graphics has a "graphics" layer type. A layer, such as the second layer 405, containing both text and graphics has a "text containing" layer type. Layers that are "text only" are also "text containing" but are commonly treated differently because they are often kept in different, often simpler, formats.

FIG. 5, labeled as "prior art", illustrates three layers. The English layer 501 has English language content 504. The Mandarin layer 502 has Mandarin language content 505. The Spanish layer 503 has Spanish language content 506. All three layers contain text and nothing else. As such, all three layers are text only layers having the text only layer type. The Spanish language content 506 and the Mandarin language content 505 are computer-generated translations of the English language content 504. The natural language of a phrase is, simply, the language it is in. English is the natural language of an English phrase. All three layers are illustrated as graphic elements. Typically, the layer type and the language of a text only layer is inferred although type and language can be explicitly marked as layer properties.

Machine translation between languages often requires the user to input a phrase and natural language. The user then chooses a destination language. A computer then translates the phrase from the natural language to the destination language. The natural language is input because the language identification algorithms run by computers are not 100% accurate in identifying languages. Language identification is difficult for very short phrases and becomes progressively easier as the amount of text increases. Many Internet search engines are capable of identifying a web page's natural language and provide utilities to translate web pages into a desired language.

The alphanumeric characters in text are often encoded using a standardized encoding. ASCII is an early character encoding used mainly for English language text. Other languages, however, use characters and punctuation that the English language does not use. Unicode is an international standard that contains many language specific character encodings. Other character encodings also exist.

FIG. 6, labeled as "prior art", illustrates rendering a version of a document 301 having multiple concurrent versions. The document 301 has five layers. The watermark layer 303 is a common layer that is intended to be included in all the document versions. The cow layer 302 contains a graphic of a cow and is also a common layer. The English layer 304 is a text only layer containing English language content. The Spanish layer 305 is a text only layer containing Spanish language content. The Mandarin layer 306 is a text only layer containing Mandarin language content.

A document version specification 601 specifies a version of the document containing English, cow, and watermark. Layering 602 is a task, often performed manually, of taking the document version specification 601, assembling the layers, and passing them to a rendering device 316. The rendering device then produces the English, cow, watermark document version 317.

The document 301 has two common layers and three text only layers. As such, there are three concurrently valid document versions. Proofing and producing all three versions of the document 301 is fairly straightforward because there are only three concurrently valid versions. In a production environment, however, even this document is complicated enough for production personnel to err. They can forget to include a common layer. They can forget to produce one of the versions. Furthermore, many documents are far more complicated than the illustrated document 301. Systems and methods to address the shortcomings of current solutions are needed.

BRIEF SUMMARY

Aspects of the embodiments address limitations and flaws in the prior art by automatically identifying and grouping layers.

It is therefore an aspect of the embodiments to obtain a document that has multiple layers. As discussed above, all layers have content. The content of each layer is used to determine that layer's layer type. Each layer is then assigned to a layer group. One layer group is the common layer group that contains layers that appear in every document version.

Layers that are text containing layers can be identified and placed into language specific layer groups. For example, English text containing layers are placed into an English layer group. One way of identifying the natural language of each layer is to examine the character encoding because, as discussed above, many character encodings contain language specific elements. Also, as discussed above, language identification algorithms are another way to identify the natural language based on the phrases in the text.

It is an aspect of some embodiments to generate document version specifications and to render document versions. A document version specification can be automatically generated by specifying all the layers in the common layer group and all of the layers in one of the language specific layer groups. An algorithm that generates all of the permissible combinations of layer groups can be used to create all the desired document version specifications. Methods and systems for generating all the permissible combinations of disparate elements are known to those skilled in the arts of mathematics, computer programming, and gambling.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

DETAILED DESCRIPTION OF THE INVENTION

The particular values and configurations discussed in these non-limiting examples can be varied and are cited merely to illustrate embodiments and are not intended to limit the scope of the invention.

Figure 1:
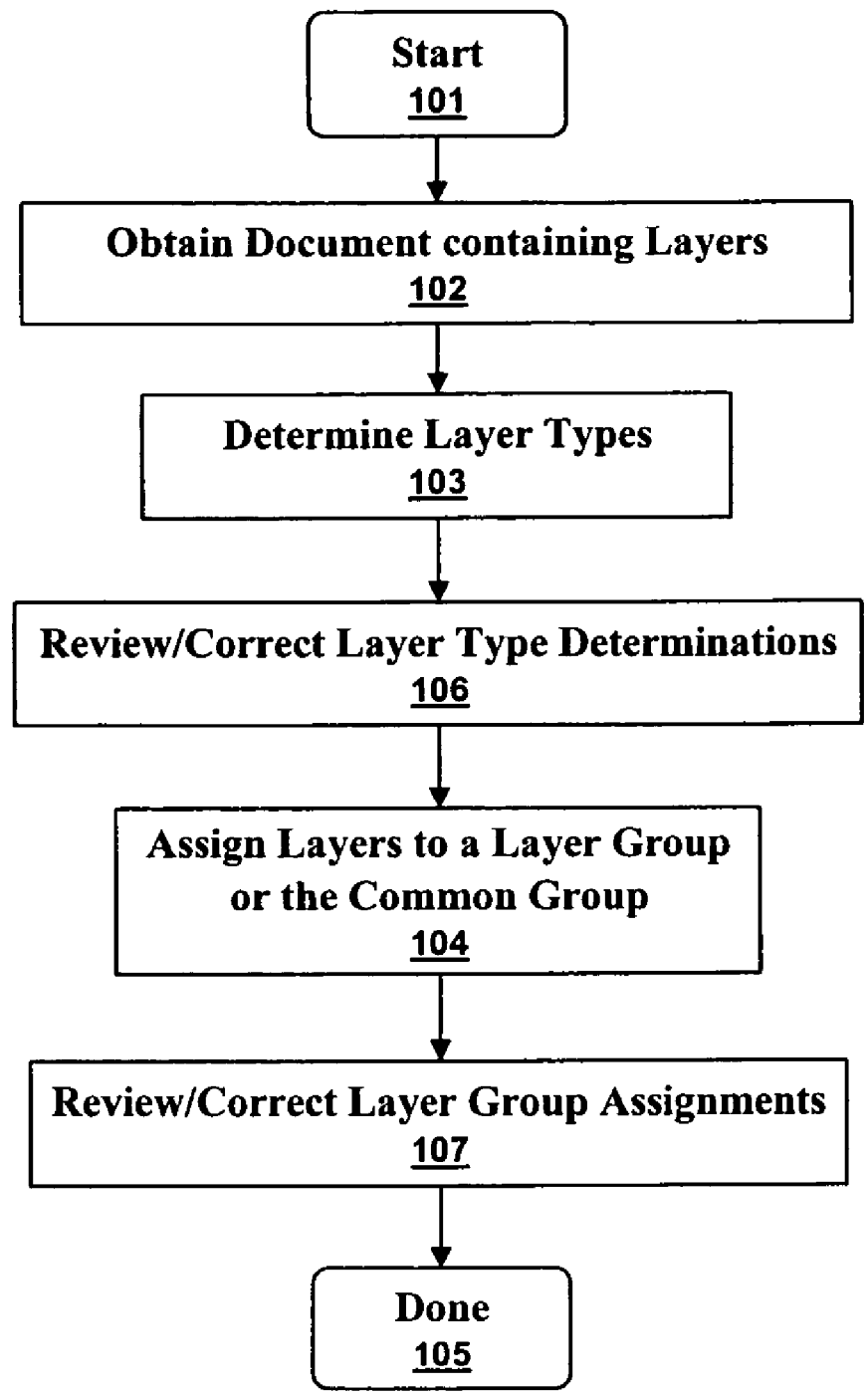
FIG. 1 illustrates a high level flow diagram of assigning a document's layers to layer groups in accordance with aspects of the embodiments.

FIG. 1 illustrates a high level flow diagram of assigning a document's layers to layer groups in accordance with aspects of the embodiments. After the start 101 a document that contains multiple layers is obtained 102. Next, the layer type of each layer is determined 103. The layer type determinations can be reviewed and corrected 106, typically by a person, to ensure that they are correct. For example, a layer can contain rasterized text that a computer algorithm classifies as graphics. A person can recognize that the graphics elements are actually text. Next, the layer is assigned to a layer group or to the common group 104. The layer group assignments can also be reviewed and corrected 107 before the process is done 105. Graphics and watermark layers can be assigned to the common group. Text containing layers can be assigned to language specific layer groups based on the layer content. Each language specific layer group is usually exclusive with respect to other language specific layer groups. For example, in most applications the layers in a English layer group and those in a Mandarin layer group are never used in the same document version.

Figure 2:
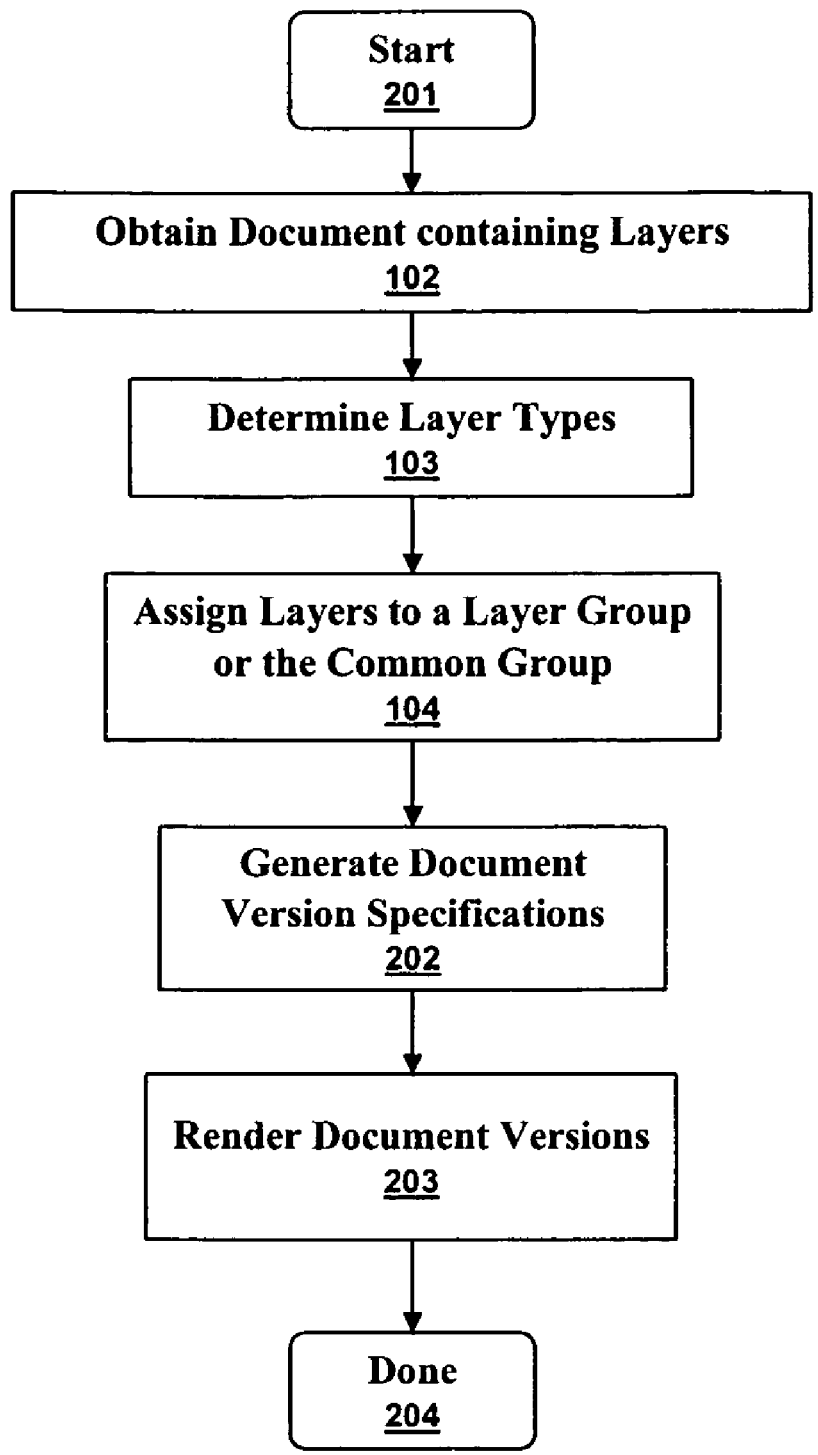
FIG. 2 illustrates a high level flow diagram of rendering document versions in accordance with aspects of some embodiments.

FIG. 2 illustrates a high level flow diagram of rendering document versions in accordance with aspects of some embodiments. After the start 201, documents are obtained 102, layer types are determined 103, and layers are assigned to layer groups 104. Next, document version specifications are determined 202. Producing every possible allowed combination of the layers in the layer groups can automatically generate all of the required document version specifications. The layers in the common group appear in every document version specification. Exclusive layer groups can then be combined with the common group in turn. For example, different document version specifications can be generated by iteratively combining the common group layers with the different language specific groups. Finally, the document versions are rendered 203 via printing or display and the process is done 204.

Figure 3:
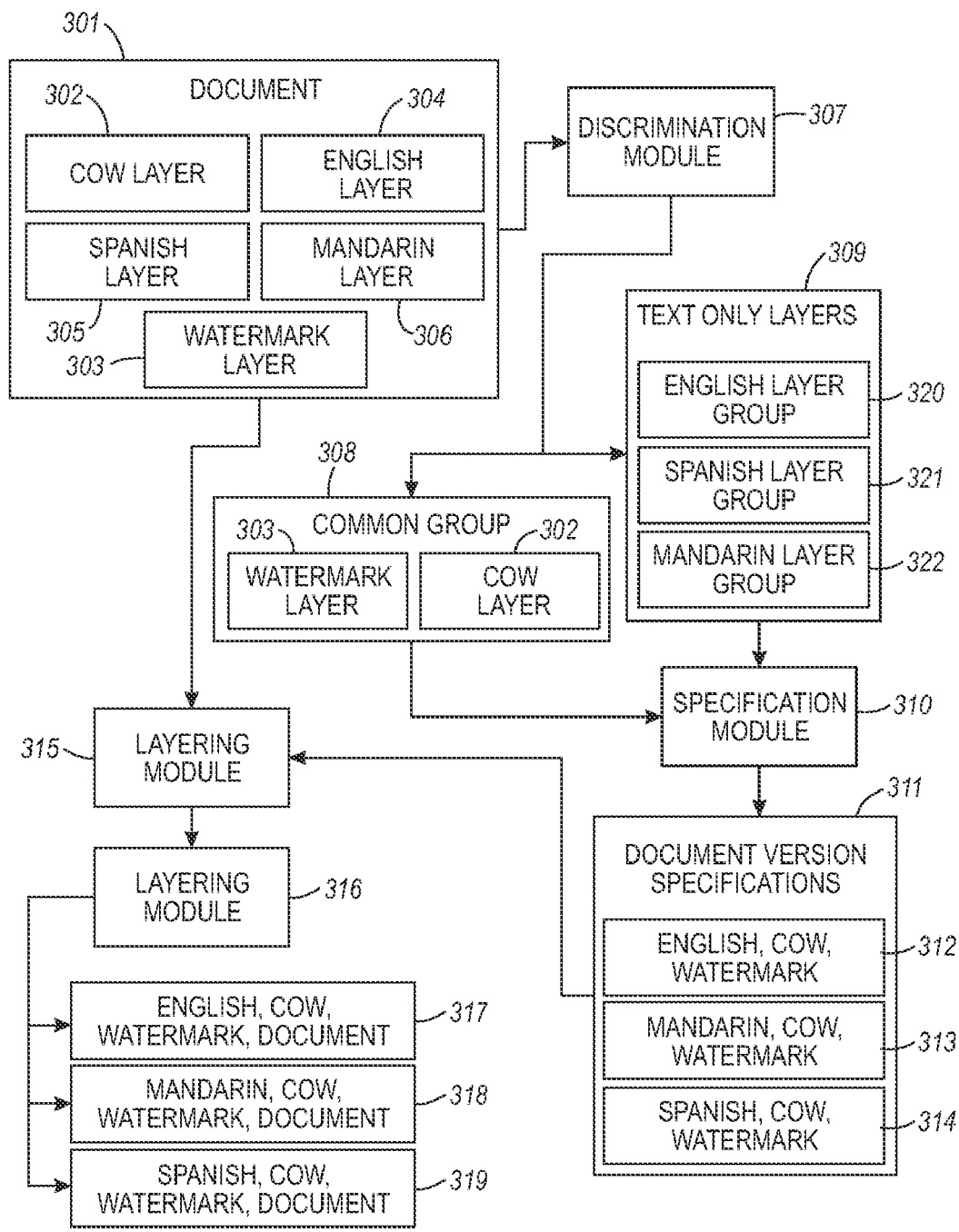
FIG. 3 illustrates rendering multiple concurrent versions of a document in accordance with aspects of the embodiments.
Figure 4:
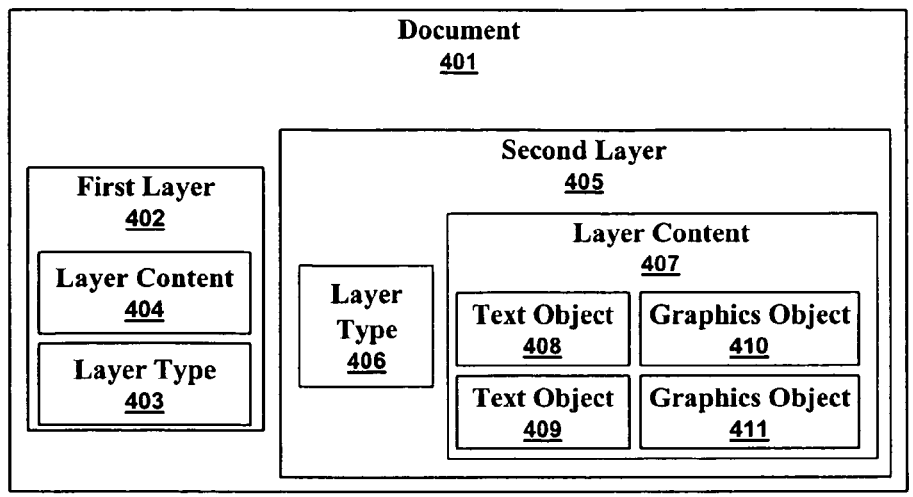
FIG. 4, labeled as "prior art", illustrates a document with a layer.
Figure 5:
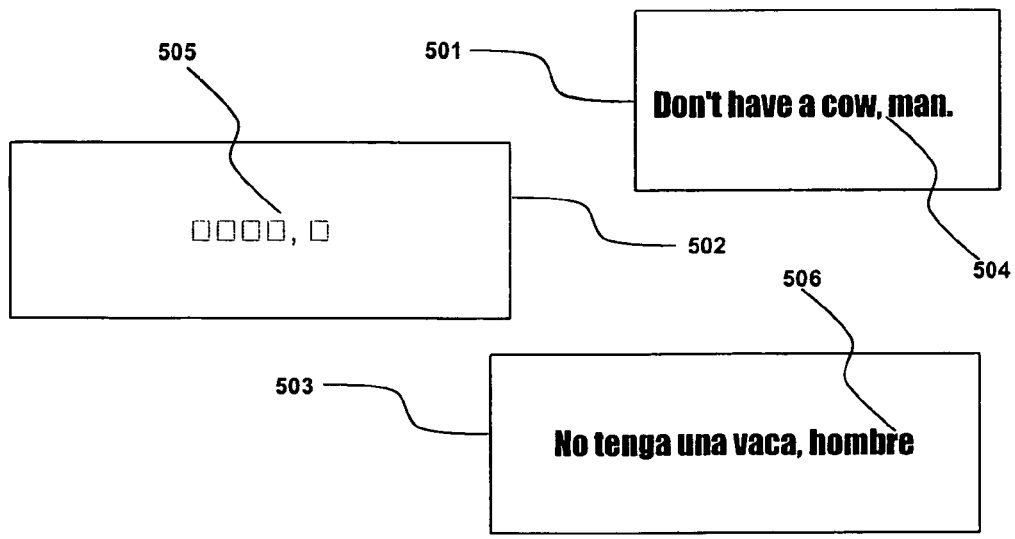
FIG. 5, labeled as "prior art", illustrates three layers.

FIG. 3 illustrates rendering multiple concurrent versions of a document in accordance with aspects of the embodiments. The document 301 has five layers. The watermark layer 303 is a common layer that is intended to be included in all the document versions. The cow layer 302 contains a graphic of a cow and is also a common layer. The English layer 304 is a text only layer containing English language content. The Spanish layer 305 is a text only layer containing Spanish language content. The Mandarin layer 306 is a text only layer containing Mandarin language content.

A discrimination module 307 examines every layer. It groups every layer that is not text containing into the common group 308. The discrimination module also identifies the text containing layers 309 and determines their natural languages. The English layer 304 is assigned to the English layer group 320, the Spanish layer 305 is assigned to the Spanish layer group 321, and the Mandarin layer is assigned to the Mandarin layer group 322.

A specification module 310 creates document version specifications 311 based on the layers in the common group and in the text containing groups. Recall that the language specific groups are exclusive with respect to each other. There can be other exclusive groupings such as the symbols associated with opposing sports teams, corporate logos, or other trademarks. The specification module 310 generates an English, cow, watermark 312 version specification, a Mandarin, cow, watermark 313 version specification, and a Spanish, cow, watermark 314 version specification.

Figure 6:
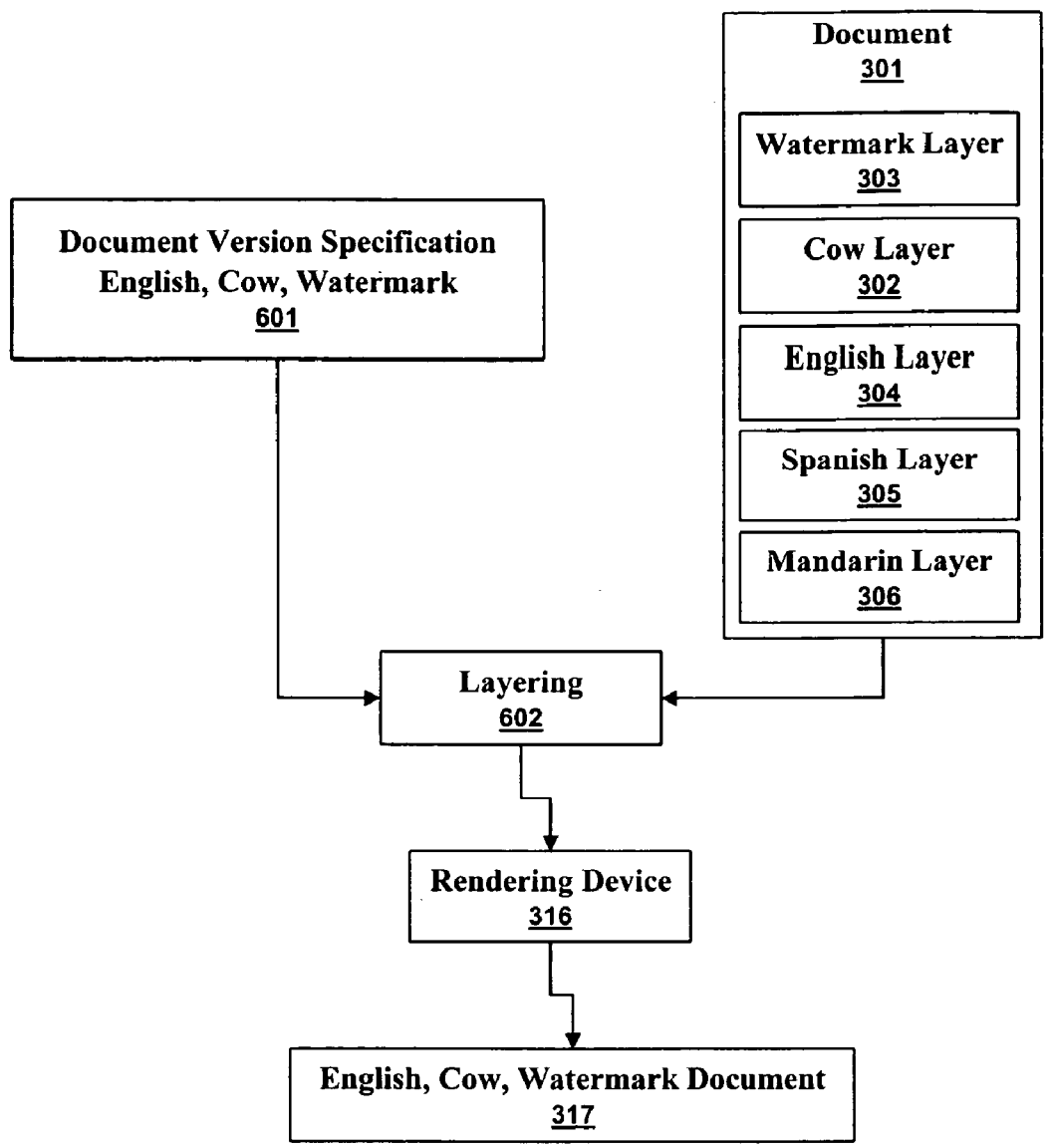
FIG. 6, labeled as "prior art", illustrates rendering a version of a document having multiple concurrent versions.

A layering module 315 takes the document 301 and the version specifications 311 and generates the information a rendering device 316 can use to generate document versions such as the English, cow, watermark document 317, the Mandarin, cow, watermark document 318, and the Spanish, cow, watermark document 319. The layering module repetitively performs layering, such as the FIG. 6 layering 602, for every different document version specification.

Embodiments can be implemented in the context of modules. In the computer programming arts, a module can be typically implemented as a collection of routines and data structures that performs particular tasks or implements a particular abstract data type. Modules generally can be composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. Thus, for example, the term module, as utilized herein generally refers to software modules, hardware modules, or implementations thereof. Such modules can be utilized separately or together to form a program product that can be implemented through signal-bearing media, including transmission media and recordable media.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method comprising:
    obtaining a plurality of layer types associated with a plurality of layer groups wherein one of the layer groups is a common group;
    obtaining a plurality of document version specifications that specify which of the layer types combine to form each of a plurality of document versions;
    obtaining a document comprising a plurality of layers wherein each one of the layers comprises layer content;
    determining the layer type of each of the layers based on the layer content of the layers;
    reviewing said layer type of each of said layers to ensure said layer has been properly classified;
    assigning each of the layers to one of the layer groups wherein one of the layers is assigned to the common group and where the layer assigned to the common group does not contain text;
    including the layer assigned to the common group in all of the document version specifications; and
    printing at least one of the document versions.

2. The method of claim 1 wherein determining the layer type of each one of the at least two layers comprises discriminating between layers having a text containing layer type, a symbol containing layer type, a logo containing layer type, a trademark containing layer type and layers having any other layer type and wherein the at least two layers comprise at least one text containing layer.

3. The method of claim 2 further comprising determining the natural language of at least one of the at least one text containing layer using a discrimination module, 4. The method of claim 3 wherein at least one of the at least one text containing layer uses a character encoding and wherein the natural language is determined based on at least one natural language factor and wherein the at least one natural language factor comprises the character encoding.

5. The method of claim 4 wherein the at least one natural language factor comprises an output from a language identification algorithm.

6. The method of claim 3 wherein the natural language is determined based on at least one natural language factor and wherein the at least one natural language factor comprises an output from a language identification algorithm.

7. A method comprising:
    obtaining a plurality of layer types wherein each of said layer types is associated with at least one of a plurality of layer groups wherein one of the layer groups is a common group;
    obtaining a document comprising a plurality of layers wherein each one of the layers comprises layer content;
    determining a layer type for each of the layers based on the layer content of the plurality of layers;
    reviewing said layer type of each of the layers based on the layer content of the plurality of layers;
    assigning each of the layers to one of the layer groups wherein one of the layers is assigned to the common group and wherein the layer assigned to the common group does not contain text;
    including the layer assigned to the common group in all of the document version specifications;
    automatically generating all permissible document version specifications;
    rendering at least one of the document version specifications to produce at least one document version.

8. The method of claim 7 wherein determining the layer type of each one of the at least two layers comprises discriminating between layers having a text containing layer type, a symbol containing layer type, a logo containing layer type, a trademark containing layer type and layers having any other layer type and wherein the at least two layers comprise at least one text containing layer.

9. The method of claim 8 further comprising determining the natural language of at least one of the at least one text containing layer using a discrimination module.

10. The method of claim 9 wherein at least one of the at least one text containing layer uses a character encoding and wherein the natural language is determined based on at least one natural language factor and wherein the at least one natural language factor comprises the character encoding.

11. The method of claim 10 wherein the at least one natural language factor comprises an output from a language identification algorithm.

12. The method of claim 11 wherein at least one of the at least one document version specification is rendered by displaying at least one of the at least one document version on a display device.

13. The method of dam 11 wherein at least one of the at least one document version specification is rendered by printing at least one of the at least one document version.

14. The method of claim 9 wherein the natural language is determined based on at least one natural language factor and wherein the at least one natural language factor comprises an output from a language identification algorithm.

15. A system comprising:
    a document comprising a plurality of layers wherein each one of the layers comprises content;
    a plurality of layer groups comprising at least one layer group and a common group wherein each one of the plurality of layers is assigned to one of at least one layer group or to the common group based on a layer type, wherein the layer type of each of the layers is based on the layer content of the layers, and wherein said assignment is reviewed to ensure said layers have been properly classified;
    a discrimination module that assigns each of the layers to one of the layers groups and wherein one of the layers is assigned to a common group wherein said layer assigned to the common group does not contain text;
    a version generation module that assembles a document version specification comprising a subset of layers that includes the layer assigned to the common group, wherein the document version specification describes a document;

a rendering device that produces the document.

16. The system of claim 15 wherein the discrimination module discriminates between layers having a text containing layer type, a symbol containing layer type, a logo containing layer type, a trademark containing layer type, and layers having any other layer type and wherein the at least two layers comprises at least one text containing layer.

17. The system of claim 16 further comprising determining the natural language of at least one of the at least one text containing layer using the discrimination module.

18. The system of claim 17 wherein at least one of the at least one text containing layer uses a character encoding and wherein the natural language is determined based on at least one natural language factor and wherein the at least one natural language factor comprises the character encoding.

19. The system of claim 18 wherein the at least one natural language factor comprises an output from a language identification algorithm.

20. The system of claim 19 wherein the natural language is determined based on at least one natural language factor and wherein the at least one natural language factor comprises an output from a language identification algorithm.

* * * * *